United States Patent [19]

Matton

[11] 3,961,124

[45] June 1, 1976

[54] SHOE-STIFFENER MATERIAL OF LATEX SATURATED FLEXIBLE FABRIC

[76] Inventor: George Matton, 528 Broadway, Lowell, Mass. 01854

[22] Filed: Nov. 4, 1974

[21] Appl. No.: 520,725

[52] U.S. Cl. ............................... 428/250; 428/521; 428/520; 428/539; 428/485; 260/887; 156/242; 428/904; 36/68; 2/1
[51] Int. Cl.² .................................... B32B 25/04
[58] Field of Search ............ 161/88, 182, 252, 254; 428/250, 539, 520, 90 A; 36/68

[56] References Cited
UNITED STATES PATENTS

| | | | |
|---|---|---|---|
| 2,611,195 | 9/1952 | Brophy et al. | 36/68 |
| 2,734,289 | 2/1956 | Heaton et al. | 36/68 |
| 3,113,906 | 12/1963 | Hamilton | 161/165 |
| 3,245,863 | 4/1966 | Sonnichsen et al. | 161/88 X |
| 3,393,461 | 7/1968 | Ryan et al. | 36/77 |
| 3,520,760 | 7/1970 | Hochner | 161/88 X |
| 3,851,411 | 12/1974 | Crosbie et al. | 36/68 |

*Primary Examiner*—William J. Van Balen
*Assistant Examiner*—Patricia C. Ives
*Attorney, Agent, or Firm*—Richard P. Crowley

[57] ABSTRACT

A shoe-stiffening material useful as a stock material to stiffen selected parts of a shoe, which material comprises: a flexible fabric material saturated with a latex composition comprising a natural or synthetic elastomeric polymer, such as styrene-butadiene rubber, and a cross-linking system comprising a peroxide agent, a vinyl polymeric activator and a metal oxide catalyst, which system is adapted to effect cross-linking of the polymer at a temperature and in a time period employed in the shoe-manufacturing process, the sheet material optionally coated on one or both sides with an adhesive thermoplastic polymer, whereby the flexible sheet material may be employed between an outer leather and an inner shoe liner, and forms a bonded, stiff stock material as a box toe stiffener or shoe counter.

12 Claims, 5 Drawing Figures

3,961,124

SHOE-STIFFENER MATERIAL OF LATEX SATURATED FLEXIBLE FABRIC

BACKGROUND OF THE INVENTION

Typically in the manufacture and assembly of a shoe-component part, a shoe manufacturer often desires to bond a box toe or heel counter, or other stiffening material, into the shoe before molding the shoe to the last. At the present, shoe manufacturers employ a woven fabric material which has been impregnated, coated or saturated with a thermoplastic polymer, such as polyvinyl acetate, a styrene-acrylic copolymer, ethylene vinyl acetate, etc. The sheet material may be coated on one or both sides with a thermoplastic adhesive to provide for bonding of the sheet material to component parts of the shoe. In operation, impregnated sheet material is positioned between an outer shoe upper material and an inner shoe liner, and placed in a mold where it is subject to heat and pressure to effect bonding of the sheet material between the leather and the shoe liner.

The thermoplastic impregnated fabrics employed as shoe stiffeners are subject to a number of disadvantages in use. One disadvantage is that the sheet material is stiff when cool, but softens when exposed to higher temperatures; that is, when subject to a temperature above the thermoplastic or solidifying temperature of the thermoplastic polymer employed. Shoes which contain such stiffener materials, when exposed to excessive heat, such as when placed in a store window subject to the sun or stored at high temperatures, have the stiffener material become soft during such exposure or storage. A further disadvantage is that the impregnated material is often just as hard during its use and manufacture as in the final state. Such material is typically stiff and difficult to handle, stretch, conform, stitch and fabricate to the desired shape. In attempt to overcome some of the disadvantages, the impregnating compositions have been compounded with plasticizers to increase the flexibility of the sheet material; however, this compounding has not been wholly satisfactory. Additional ingredients have also been added to the formulation, such as fillers, clays and the like, in order to provide for an increase in solids content at a reduced cost.

Shoe-stiffening materials of the thermoplastic type are described in U.S. Pats. Nos. 2,734,289; 3,113,906; and 3,393,461.

Thermosetting resins have been suggested for use in impregnating fabrics for shoe-stiffening materials, but are not commercially used or acceptable. Melamine-formaldehyde-saturated textile materials which are activated by immersion in an ammoniumchloride solution have been used, but are not acceptable because of residual toxicity and skin irritation problems. Elastomeric latex formulations have also been suggested as impregnants (see U.S. Pat. No. 2,611,195). However, toxicity, skin irritation, inability to control the reaction within the shoe-manufacturing process conditions, cosmetic problems and other factors have prevented commercial acceptance of such thermosetting resins for shoe-stiffening materials.

SUMMARY OF THE INVENTION

My invention relates to a thermosetting shoe-stiffening material and the methods of preparing and using such sheet material. In particular, my invention concerns a flexible sheet material containing a cross-linkable elastomer and a peroxide-curing system adapted to cure the material to a stiffened condition at temperatures, pressures and time cycle periods employed in shoe-manufacturing processes. More particularly, my invention involves a sheet material suitable as a shoe-stiffening material composed of a filler or woven fabric which has been made with a styrene-butadiene rubber, a polyvinyl acetate polymer activator, a calcium oxide catalyst and a peroxide-curing agent. The sheet material, prior to cure, is a limp flexible sheet material which may be easily handled, stitched and fabricated, and which, on exposure to temperatures of 135° to 150°C employed in conventional shoe-making molds, induces cross-linking of the elastomer and stiffening of the sheet material.

My invention provides a shoe-stiffening material which is free from limitations and disadvantages of other sheet materials employed as shoe-stiffening material, while enabling the user to stiffen selected parts of the shoe, such as the toe and heel sections, and to obtain the advantages of my invention while employing and utilizing conventional shoe-making machinery and process conditions associated therewith. My material is subject to cross-linking in relatively short time cycles; e.g., 5 to 30 seconds, employed in the production of shoe-component parts, and at the same temperature ranges that a shoe manufacturer would provide to position, fix and form the component parts of a shoe into a shoe. My shoe-stiffening material is relatively soft, limp, ductile and flexible at the time it is employed and assembled, so that it may readily be fabricated, stitched and assembled prior to use. My material is controllable in the shoe-making process, but, on exposure to shoe-making temperatures, may be made stiff and resilient and progressively polymerized by a thermally induced chemical reaction to a thermoset polymeric stiffened material.

After stiffening, my sheet material is not subject to change in shape due to variations in temperature exposure of the shoe, and in addition is resistant to moisture. Thus, the stiffened parts of the finished shoe are insensitive to further heat, moisture or atmospheric changes, while the hardness of the stiffened material is provided only to the extent required and to the extent it contributes to the pleasing contours and firmness as required or desired by the shoe manufacturer. My sheet material may be hardened to the thermoset condition during shoe production during a relatively short time cycle as presently employed by a shoe manufacturer in order to maintain adequate economic shoe production; that is, at typical time cycles of 5 to 30 seconds; e.g., 10 to 20 seconds, in the mold at the usual mold temperatures of 135° to 150°C, and at the pressures employed at 30 to 80 psi. My material may be used as a direct substitute for the prior sheet material without changes in production techniques, process conditions or shoe machinery modifications. My material may be used in high-fashion shoes, as well as in athletic footwear like sneakers where more flexibility is desired.

I have found that fibrous sheet materials may be saturated, coated, impregnated or otherwise treated with a latex composition comprising natural or synthetic elastomeric polymers, which polymers are subject to cross-linking, which formulations also contain a free-radical cross-linking system to induce cross-linking of the polymer to a thermosetting condition at a temperature of less than about 135°C. In my invention, it is essential that the thermally induced cross-linking chemical reaction occur at more than about 120°C. Preferably, I have found that the cross-linking should occur at about 135°C or greater, but not more than 150°C, and in a rapid time cycle or half-life time.

If free-radical polymerization or cross-linking of the elastomer occurs at lower temperatures, then the shelf life of the sheet material may be seriously affected, while, in addition, the temperature required to dry adequately the impregnated sheet material or to apply the adhesive coatings may also be limited. For example, a shoe-stiffening sheet material is often stored for a period of time prior to use in warehouses or shipped in the holds of vessels wherein temperatures approaching 80° to 95°C may occur. Accordingly, the cross-linking agent selected should be sufficient to prevent any premature or preliminary cross-linking which would stiffen the sheet material prior to use. Cross-linking of the polymer should also occur at a temperature not higher than about 150°C, since electrically heated or other molds now employed in shoe-making machinery do not reach temperatures above this temperature in the short time cycles required for efficient shoe production. In addition, higher temperatures are undesirable, since many of the fabrics to which the shoe-stiffening material is bonded are vinyl or urethane-coated or have other thermoplastic-coated fabrics, such as imitation vinyl resin leathers, and higher temperatures may affect the cosmetics and appearance of the other shoe components, or can also scorch the fabrics or leathers employed in a shoe-making process. Thus, it is essential in my invention to provide for a change from a limp, flexible and ductible sheet material to a stiff thermoset saturated sheet material only within the desired shoe-processing temperature and time cycle range.

My peroxide cross-linkable elastomeric sheet material is stable during storage and prior to use, and is the latex formulated to provide for cross-linking of the elastomer without residual toxic peroxide by-products and without odor or other problems associated with the use of solvents and separate activating solutions. In addition, the peroxide-curing system not only is activated at the desired temperature, but also is efficiently used up during the cross-linking process.

The curing agents useful in my curing system should not decompose with skin-irritating or toxic residue by-products, and should be stable in solutions or dispersons above 50°C. Peroxides which are stable at ambient temperatures tend to require high temperatures for cross-linking, and thus often are not useful and not efficiently employed within the narrow shoe-processing temperature range. Thus, my curing system requires a curing agent, such as dicumyl peroxide in combination with a vinyl group such as polyvinyl acetate, to lower the initial activation temperature of the agent, and a metal oxide, such as calcium oxide, as a catalyst to promote efficient and full use of the activated peroxide during the time cycle; i.e., to control the residence time.

My formulation may also include additional materials, such as colloidal dispersants, silicone compounds, clays, fillers, fibers, pigments, dyes, antioxidants, plasticizers, a combination of cross-linking agents, surfaccizers, dispersant aids, accelerators, colorants, antistatic tants, light stabilizers, preservatives, lubricants, flame agents, retardants and other additives employed, alone or in combination, in latex and elastomeric compositions. Preferably, my formulations are saturated or impregnated into a fibrous sheet material as a latex composition, and, for example, the latex formulations have from about 5 to 150 phr; e.g., 10 to 50 phr, content.

The elastomeric polymer comprises natural or synthetic elastomers and blends thereof, and preferably diene-conjugated ethylenically unsaturated elastomers, with a styrene-butadiene rubber wherein the butadiene comprises a major amount of the rubber as the preferred elastomeric polymer of my formulation. Typical elastomeric polymers which are subject to cross-linking by the use of peroxides include, but are not limited to: natural rubber; styrene-butadiene rubber; polybutadiene rubber; polyisoprene rubber; nitrile rubber; e.g., acrylonitrile-butadiene; neoprene rubber; ethylene-propylene copolymers and terpolymers; silicone rubber; elastomeric acrylic polymers; polyurethane elastomers; acrylonitrile-butadiene-styrene elastomers; and similar elastomers. I have found that styrene-butadiene rubber in a latex formulation is the preferred formulation, since the high butadiene content provides for an elastomeric material which, on thermosetting, although it is stiff, has a high impact resistance.

The cross-linking agent employed may be any activated peroxide agent which provides free radicals within the described temperature range, such as organic and inorganic peroxides, with the preferred agent being dicumyl peroxide. The activated temperature and half-life time of the peroxide selected will determine the peroxide which may be employed. Various peroxides may be used alone or in combination to provide the desired cross-linking. Thus, organic or inorganic acyl or alkyl peroxides may be employed, but typically, the acyl peroxide of dicumyl peroxide is preferred, since such peroxide provides on activation for rapid thermosetting of the elastomer within the desired temperature range and time cycle, and has nontoxic residue products and is stable. Typical peroxides which may be employed include, for elastomers with low compression set, but are not limited to: $\alpha,\alpha,$-bis(t-butyl peroxy) diisopropylbenzene (Vul-cup); dicumyl peroxide (Di-cup); n-butyl 4,4-bis(t-butyl peroxy) valerate; 2,5 dimethyl-2,5 di (t-butyl peroxy) hexane; t-butyl peroxy benzoate; t-butyl peroxy isopropyl carbonate; and 1,1-bis(t-butyl peroxy)-3,3,5-trimethyl cyclohexane, all of which cross-link rubber at 150° to 205°C in the nonactivated state. The cross-linking agent may be employed in the formulation in amounts sufficient to cross-link, and typically, in amounts from about 0.5 to 10 parts per hundred parts per resin (phr); for example, 1.0 to 3.0 phr.

My curing system includes, with the peroxide agent, small activating amounts of a vinyl compound which function to promote the free-radical generation of the peroxide once it has been activated at the low temperature of 120° to 135°C by the metal oxide. Vinyl polymers are preferred for activation, such as thermoplastic noncross-linked vinyl polymers, which do not stiffen the sheet material. The preferred polymer is polyvinyl acetate or copolymers of vinyl acetate. Other polymers include polyvinyl pyrrolidone, ethylene vinyl acetate and the like, while vinylchloride resins are not suitable. The vinyl polymers should be used in an amount of from about 0.001 to 0.5 phr; e.g., 0.05 to 0.5 phr.

The peroxide agent is lowered in initial activating temperature by a metal oxide catalyst, preferably an alkali or alkaline earth oxide, such as sodium oxide; potassium oxide, barrium oxide, magnesium oxide, and is most preferred because of cost, color, availability and action in calcium oxide. The calcium oxide, for example, lowers the initial activation temperature of dicumyl peroxide to 70° to 80°C, which is the typical temperature reached in a shoe-manufacturing process on the inside of the counter when the mold is at 150°C and the process time is 10 to 20 seconds. The amounts used may vary, but typically range from about 0.01 to 1.0 phr; e.g., 0.05 to 0.5 phr.

The fibrous sheet material subject to treatment with my formulation may comprise any absorbent or liquid-holding fibrous material, and particularly an absorbent woven or nonwoven fabric material. The fabric material provides for a structural reinforcement and enhances the stiffened component parts when employed in a shoe-manufacturing operation. Suitable fabrics which may be employed as the sheet substrate include, for example, but are not limited to: cotton and synthetic fibers of woven or nonwoven fabrics of high absorbency qualities; napped twills and flannels and any absorbent fiber base material which will accept and retain the thermosetting elastomer in the recommended amounts during the saturating, impregnating and/or coating steps. The effectiveness and suitability of the stiffened component parts employed depend in part upon the ratio of the base fabric to the saturated or impregnated chemical composition by weight. I have found that a satisfactory shoe-stiffening material is provided when the amount of dry formulation ranges from 20 to 50% by weight of the sheet, such as, for example, from about 25 to 35%.

My formulations can be produced and applied to the absorbent fabric material in a number of ways, but any suitable technique may be used which permits the coating, casting saturation and/or impregnation of the material throughout all or a substantial part of the body of the sheet material with the thermosetting formulation in an amount sufficient to provide for its use in a shoe-stiffening material. Typically, the absorbent fabric material may be immersed in a latex formulation or a latex formulation metered onto one or both sides of the material. Where the latex formulation comprises, for example, 50% by weight of solids, the coating weight should be sufficient to provide for about 10 to 20 dry ounces of elastomer per square yard of material.

After latex saturation of the absorbent fabric material, the material is dried at a temperature typically not more than about 110°C in order to prevent any premature cross-linking or to affect the shelf life of the dry material. After drying the dry saturated sheet material is optionally then coated on one or both sides with a thermoplastic adhesive material which serves as a thin adhesive-bonding layer for the fabrication of the sheet into a shoe component.

Any thermoactive, either thermoplastic or thermosetting, adhesive polymeric material may be applied to either or both sides of the dry saturated stiffening stock to aid in bonding the stiffening material to the shoe components, but typically, the coating layer is in a film thickness of approximately 2 to 20 mils; for example, 2 to 10 mils. Suitable polymeric adhesive compositions may comprise latex, solvent or hot-melt adhesive formulations; for example, those presently employed on shoe-stiffening materials. In addition, decorative-type coatings may be applied where desired, such as the coating may be a textile flocked coating, to the dry surface of the saturated sheet material to improve the cosmetic or abrasion resistance or other qualities of the surface of the sheet material.

Another advantage of my invention is that when a thermoplastic adhesive coated layer is used, such as ethylene vinyl acetate, the peroxide in the saturated fabric tends to raise the glass transition temperature of the polymers (e.g., 5° to 10°C). This increase in temperature makes the adhesive layer less susceptible to low-temperature activation. Also, the peroxide tends to cross-link some of the ethylene vinyl acetate to promote better bond adhesion. The adhesive polymer usually has a tacky thermoplastic range of 50° to 70°C for adhesion purposes.

My coated saturated material is ductile, flexible and may be easily assembled, fabricated, cut or stitched as desired by the shoemaker prior to stiffening. In its typical use, the flexible coated impregnated sheet material is placed between an outer shell of leather or imitation leather material and an inner soft shell of a liner bonding, or the liner bonding may not be used where the one surface of the stiffening material has been treated by cosmetic or abraded purposes, and the assembled component parts then inserted into an electrically heated mold. A mold pressure of from 50 to 150 pounds and a temperature of 135° to 150°C in a relatively short production cycle of 5 to 30 seconds; e.g., 10 to 20 seconds, are employed to bond the assembled components together. In the mold, the saturated sheet material becomes thermoset and stiff, and each surface is then bonded to the respective leather and liner material to form a desired component of the shoe.

For the purposes of illustration only, my sheet material and its use will be described in conjunction with the saturation of an absorbent fabric material with a particular formulation, and the use of the formulation in a particular shoe-making operation. However, as recognized by those skilled in the art, other and various modifications may be made in my sheet material, the method of preparation and its use, all falling within the spirit and the scope of my invention.

DESCRIPTION OF THE EMBODIMENTS

Figure 1:
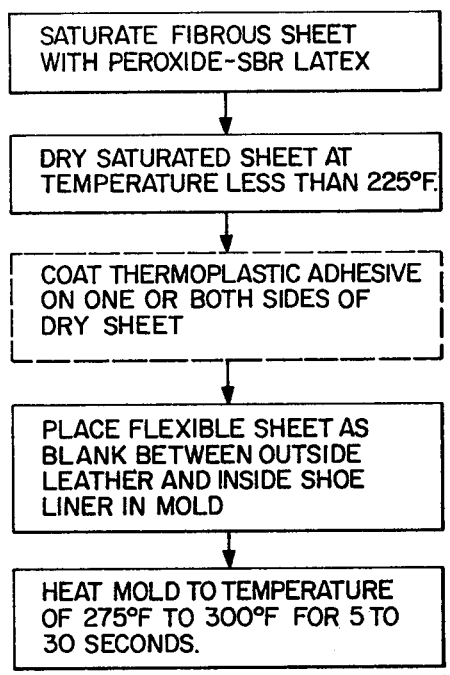
FIG. 1 represents a schematic block flow process diagram of the process of preparing and using my material.

FIG. 1 illustrates in block process form the various steps in preparing and using my shoe-stiffening material. For example, a cotton flannel double-nap sheet material having 2.35 yards per pound or a thicker and heavier product if desired, utilizing a heavier substrate, such as 1.6 yards per pound of a cotton flannel, is saturated with latex formulation in an amount to provide a total finish weight of about 30% of the textile base and about 70% of the thermosetting elastomer. The formulation employed is that set forth in Table I, and is applied to the absorbent cotton fabric web by immersing the fabric in a continuous fashion in an aqueous bath of the formulation, and then squeezing excess amounts from the fabric by use of accurately set metering nip rolls, which rolls also assist in the penetration of the formulation and leveling of the formulation in the fabric. Other techniques of treating and impregnating or coating one or both surfaces of the cotton fabric may be employed, such as the metering onto one or both surfaces in sequence the desired amounts of the latex compound, as by bar-coating, reverse roll, knife-coating or other similarly known coating, saturating and impregnating techniques.

The amount of dry solids to be deposited and saturated into the fabric relates directly to the percentage of solids contained in the latex formulation, the adjustment gap of the metering nip rolls and the viscosity of the formulation. In passing the saturated fabric through the nip rolls, the excess formulation removed from the fabric runs back into the immersion tank for reuse. The still wet coated and saturated absorbent fabric is then led from the metering rolls to the head end of a tenter frame and then fixed to the tenter pins. This frame is then used to carry the saturated fabric in conveyer fashion through one or more zoned hot-air ovens or their equivalents for drying. The drying of the coated unsaturated fabric must be carried out at ambient temperatures not to exceed about 107°C, since higher temperatures cause premature thermosetting action to commerce; e.g., over 65°C.

The dry saturated fabric with a moisture-retention level of typically not more than 10%; for example, 2 to 8%, is led from the let-off end of the tenter frame oven through a pair of steel calender rolls where, at pressures up to 100 pounds per linear inch, the sheet is calendered and the surfaces smoothed to a uniform thickness.

A thermoactivating adhesive composition may be applied to either or both sides of the dried saturated sheet material, and is typically a hot-melt adhesive. Suitable adhesive compositions may comprise those composed of a thermoplastic polymer, such as vinyl acetate, such as an alkyl vinyl acetate like ethylene vinyl acetate, hydrocarbon resins and waxes or combinations thereof. A typical and suitable hot-melt adhesive for this purpose, which is applied onto one or both surfaces through the use of a heated knife, is set forth in Table II. If desired, decorative top coatings, such as a textile flocking material, may be applied and secured to the dried surface of the saturated fabric where desired to improve cosmetic or abrasion-resistant qualities, either to both sides where no adhesive layer is used, or to one side thereof.

In one embodiment, the dried, coated, saturated, fibrous sheet material suitable for use as a shoe stiffener is then employed in a shoe-manufacturing operation by placing a cut or formed blank of the limp, flexible sheet between a natural or synthetic outside leather sheet and an inside fabric shoe liner within an electrically heated mold. The mold is subjected to a temperature of 80° to 150°C for a time of approximately 12 to 18 seconds, at a pressure of from about 60 to 100 pounds.

Figure 2:
FIG. 2 is a representative cross-sectional enlarged view of a saturated fibrous sheet material as prepared in FIG. 1.

FIG. 2 shows a sheet material 10 composed of an absorbent fabric 12 saturated with a peroxide curable elastomeric thermosetting polymer which forms a coating 14 on either side of the fabric, whereon a thin hot-melt adhesive coating 16 is applied on either side.

Figure 3:
FIG. 3 is a representative cross-sectional enlarged view of another embodiment of a saturated fibrous sheet material of my invention.

FIG. 3 shows a sheet material composed of an absorbent fabric 12 wherein an elastomeric peroxide curable polymer is formed as a coating 14 on one surface, which coating only partially impregnates the fabric 12, and which also contains a thin hot-melt adhesive 16 coated thereon.

Figure 4:
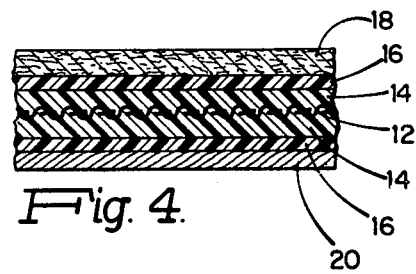
FIG. 4 is a representative cross-sectional view of the sheet material of FIG. 1 employed as a shoe stiffener.

FIG. 4 illustrates an assembled sandwich wherein a layer of leather 18 is bonded through adhesive bond 16 to a sheet material of my invention wherein the elastomer 14 has a coating impregnated on absorbent fabric 12 which is in its thermoset or cured condition, while the opposite surface of the material is bonded to shoe liner fabric 20.

Figure 5:
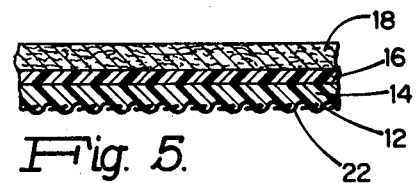
FIG. 5 is a representative cross-sectional enlarged view of the sheet material of FIG. 3 employed in a shoe stiffener.

FIG. 5 shows the embodiment of FIG. 3 wherein only one surface is bonded to a leather layer 18 through the hot-melt adhesive 16, with the coated elastomeric formulation 14 being cured under thermoset conditions, with the surface 22 being dyed, decorative and a finished surface.

TABLE I

| Latex Formulation | Weight |
| --- | --- |
| 1. Styrene-butadiene rubber (40% solids, 60% butadiene) | 532.00 pounds |
| 2. Styrene-butadiene rubber (54% solids, 25% butadiene) | 168.00 pounds |
| 3. Colloidal dispersant | 0.70 pounds |
| 4. Clay dispersion (1) | 100.00 pounds |
| 5. Peroxide dispersion (2) | 5.25 pounds |
| 6. Polyvinyl acetate | 0.70 pounds |
| Total | 806.65 pounds |

| (1) Clay Dispersion | |
| --- | --- |
| Alkylaryl polyethyl alcohol nonionic surfactant | 24.50 pounds |
| Calcined clay (calcium oxide) | 42.00 pounds |
| Sodium salts of polymerized alkyl naphthenate sulfonic acid | 0.25 pounds |
| (2) Peroxide Dispersion | |
| Dicumyl peroxide (active oxygen 21.7%) | 840.00 grams |
| Allylaryl polyether alcohol nonionic surfactant | 840.00 grams |
| Kaolin clay | 840.00 grams |
| Water | 380.00 grams |

The peroxide dispersion should be stored and kept at a temperature perferably less than 51°C to insure against the premature release of oxygen.

TABLE II

| Hot-Melt Adhesive Formulation | |
| --- | --- |
| Ethylene vinyl acetate | 40 parts |
| Tackifying hydrocarbon resin | 40 parts |
| Petroleum wax (paraffin 18°) | 20 parts |

My shoe stiffening material has been illustrated for use as a heel counter of a shoe.

In the shoe-manufacturing process illustrated, the time cycle of bonding can be as low as 5 to 16 seconds, or as long as desired; however, short time periods are most desired for efficient production with typical time cycles for the operation ranging from about 10 to 30 seconds. The shoe molds often do not exceed 150°C, or are less than 135°C. In the laminate of FIG. 4, the temperature inside of the counter during such time periods and with such mold temperatures would be 74° to 78°C, and thus the curing system must be activated at this temperature range as a minimum, and, of course, not over the mold temperature. Thus, there exists a temperature gradient across the shoe-stiffening material in usual operations of 34° to 48°C.

My invention has been illustrated with a particular formulation and materials; however, it is recognized that various substitutions can be made in such formulation and in the process conditions for preparing my fibrous sheet. For example, various natural and synthetic elastomers may be substituted in whole or in part for the styrene-butadiene rubber. My invention has also been described in connection with the impregnation or saturation which is the preferred embodiment of an absorbent fabric. However, as set forth, my formulations may also be coated on one or both sides of a fabric material where only impregnation and saturation occur, particularly where one side of the fabric is to be employed as a decorative or cosmetic material, such as dyed, finished or flocked or otherwise treated for appearance or quality sake. As described, my invention permits the ready use on conventional shoe machinery in place of thermoplastic-type sheet materials presently employed, and permits the many and distinct advantages of my invention to be used readily, particularly in the shoe industry.

What I clam is:
1. A shoe-stiffening material which comprises an absorbent fibrous flexible sheet material impregnated with:
   a. a natural or synthetic elastomer subject to cross-linking to a thermosetting condition by a peroxide cross-linking agent;
   b. a cross-linking amount of a peroxide-curing system which comprises
      i. a peroxide cross-linking agent having an activation temperature of above 150°C, and which has no toxic residue products on activation,
      ii. a metal oxide selected from the group consisting of sodium oxide, potassium oxide, barium oxide, calcium oxide and magnesium oxide in an amount of from 0.01 to 1.0 phr to lower the activation temperature of the peroxide to below 150°C and more than 70°C, and
      iii. a thermoplastic vinyl polymer is an amount of from 0.001 to 0.1 phr to promote the efficiency of the peroxide on activation; and
   c. the material being soft, limp, ductile and flexible, but which material is converted on heating to a stiff and resilient material in a shoe mold having a temperature of from about 135° to 150°C for a period of time for about 5 to 30 seconds.

2. The material of claim 1 wherein the elastomer is a butadiene-styrene copolymer.
3. The material of claim 1 wherein the peroxide is dicumyl peroxide.
4. The material of claim 1 wherein the vinyl polymer is polyvinyl acetate or ethylene vinyl acetate.
5. The material of claim 1 wherein the elastomer is a butadiene-styrene copolymer, the peroxide is dicumyl peroxide, the metal oxide is calcium oxide, and the vinyl polymer is polyvinyl acetate.
6. The material of claim 1 wherein the sheet is a woven cotton sheet.
7. The material of claim 1 wherein the sheet contains from about 10 to 20 ounces per yard of the elastomer.
8. The material of claim 1 wherein the sheet includes a layer of 2 to 20 mils of a thermoplastic adhesive layer on one or both surfaces of the sheet material.
9. The material of claim 1 wherein the cross-linking agent is present in an amount of from about 0.5 to 10 parts per 100 parts of elastomer.
10. The material of claim wherein the material has a moisture level of from about 2 to 8% by weight.
11. The material of claim 1 which contains an adhesive layer on one or both surfaces thereof, the adhesive layer comprising a thermoplastic vinyl acetate resin, a hydrocarbon resin and wax or combinations thereof.
12. A shoe-stiffening material which comprises:
   a. an absorbent woven cotton sheet material having a moisture level of less than about 10% and impregnated with an amount of from about 20 to 50% by weight of a styrene butadiene peroxide cross-linkable elastomer which contains a cross-linking amount of a peroxide-curing system which comprises:
      i. from about 0.5 to 10 parts per hundred parts of elastomer of dicumyl peroxide,
      ii. from about 0.01 to 1.0 phr of calcium oxide, and
      iii. from about 0.01 to 0.1 phr of polyvinyl acetate or ethylene vinyl acetate,
   b. the cotton sheet material having on one or both surfaces a thermoplastic adhesive layer which comprises polyvinyl acetate, ethylene vinyl acetate, hydrocarbon resin and wax or combinations thereof; and
   c. the material being soft, limp, ductile and flexible, but which material is converted on heating to a stiff and resilient material when heated in a shoe mold having a temperature of from about 135° to 150°C for a period of time for about 5 to 30 seconds.

* * * * *